United States Patent
Kawai et al.

(10) Patent No.: US 11,079,051 B2
(45) Date of Patent: Aug. 3, 2021

(54) EMERGENCY DETACHMENT MECHANISM FOR FLUID HANDLING DEVICE

(71) Applicants: TOKYO BOEKI ENGINEERING LTD., Tokyo (JP); KAWASAKI HEAVY INDUSTRIES, LTD., Kobe (JP)

(72) Inventors: Tsutomu Kawai, Nagaoka (JP); Tomoaki Umemura, Akashi (JP)

(73) Assignees: TB GLOBAL TECHNOLOGIES LTD., Tokyo (JP); KAWASAKI HEAVY INDUSTRIES, LTD, Kobe (JP)

( * ) Notice: Subject to any disclaimer, the term of this patent is extended or adjusted under 35 U.S.C. 154(b) by 0 days.

(21) Appl. No.: 16/485,040

(22) PCT Filed: Feb. 2, 2018

(86) PCT No.: PCT/JP2018/003622
§ 371 (c)(1),
(2) Date: Aug. 9, 2019

(87) PCT Pub. No.: WO2018/147189
PCT Pub. Date: Aug. 16, 2018

(65) Prior Publication Data
US 2020/0010314 A1  Jan. 9, 2020

(30) Foreign Application Priority Data
Feb. 10, 2017 (JP) .............................. JP2017-023081

(51) Int. Cl.
*F16L 37/30* (2006.01)
*F16K 17/36* (2006.01)
(Continued)

(52) U.S. Cl.
CPC .............. *F16L 37/30* (2013.01); *F16K 17/36* (2013.01); *F16L 23/12* (2013.01); *F16L 59/188* (2013.01);
(Continued)

(58) Field of Classification Search
CPC ......... F16L 37/32; F16L 59/188; F16L 37/38; F16L 37/40; F16L 23/12; F16K 17/36
See application file for complete search history.

(56) References Cited

U.S. PATENT DOCUMENTS

| 4,512,369 A | 4/1985 | Takahashi |
| 4,586,537 A | 5/1986 | Takahashi |

(Continued)

FOREIGN PATENT DOCUMENTS

| CN | 2690369 Y | 4/2005 |
| CN | 102971570 A | 3/2013 |

(Continued)

OTHER PUBLICATIONS

International Preliminary Report on Patentability for PCT/JP2018/003622 dated Feb. 15, 2019 [PCT/IPEA/409].

(Continued)

*Primary Examiner* — Kevin L Lee
(74) *Attorney, Agent, or Firm* — Sughrue Mion, PLLC (57) ABSTRACT

To provide an emergency detachment mechanism for a fluid handling device that has exceptional heat insulation performance and enables liquid hydrogen or another very-low-temperature fluid to be handled. An emergency detachment mechanism for a fluid handling device provided with a pair of couplers 1, wherein each of the pair of couplers 1 has a coupler body part 5 including an internal tube part 2 in which a fluid passes through an interior and which opens at a distal end side, an external tube part 3 which forms a vacuum layer 9 with the internal tube part 2 and which opens (Continued)

at a distal end side, and a connecting flange part 4 that closes off a space between the internal tube part 2 and the external tube part 3, a wall thickness of the connecting flange part 4 being less than a wall thickness of the external tube part 3.

4 Claims, 4 Drawing Sheets

(51) Int. Cl.
    *F16L 59/18*         (2006.01)
    *F16L 23/12*         (2006.01)
    *B67D 7/32*          (2010.01)
    *B67D 9/00*          (2010.01)

(52) U.S. Cl.
    CPC ............... *B67D 7/32* (2013.01); *B67D 9/00* (2013.01); *F17C 2205/037* (2013.01)

(56) References Cited

U.S. PATENT DOCUMENTS

| | | | |
|---|---|---|---|
| 5,253,675 A * | 10/1993 | Ooshio et al. .......... | F16L 29/04 137/614.05 |
| 6,132,553 A | 10/2000 | Ikeda et al. | |
| 2001/0054818 A1 | 12/2001 | Fujikawa et al. | |
| 2013/0146146 A1 * | 6/2013 | Sethre ..................... | F16L 37/00 137/1 |
| 2017/0138522 A1 * | 5/2017 | Foner ....................... | F16L 37/34 |
| 2018/0224034 A1 * | 8/2018 | Kawai et al. ............ | F16L 37/32 |
| 2020/0182389 A1 * | 6/2020 | Frere ..................... | B67D 7/3218 |

FOREIGN PATENT DOCUMENTS

| | | |
|---|---|---|
| CN | 104285090 A | 1/2015 |
| CN | 105221932 A | 1/2016 |
| GB | 1 002 559 A | 8/1965 |
| JP | 58-130193 U | 9/1983 |
| JP | 58-178087 A | 10/1983 |
| JP | 10-335252 A | 12/1998 |
| JP | 2006-194422 A | 7/2006 |
| JP | 2008-218809 A | 9/2008 |
| JP | 2015-097246 A | 5/2015 |
| JP | 2015-517061 A | 6/2015 |
| JP | 2016-070374 A | 5/2016 |
| JP | 2017-020584 A | 1/2017 |

OTHER PUBLICATIONS

International Search Report for PCT/JP2018/003622 dated Apr. 24, 2018 [PCT/ISA/210].
International Preliminary Report on Patentability dated Aug. 15, 2019 in application No. PCT/JP2018/003622.
Communication dated Sep. 29, 2020 from the State Intellectual Property Office of the People's Republic of China in application No. 201880011233.8.

* cited by examiner

EMERGENCY DETACHMENT MECHANISM FOR FLUID HANDLING DEVICE

CROSS REFERENCE TO RELATED APPLICATIONS

This application is a National Stage of International Application No. PCT/JP2018/003622 filed Feb. 2, 2018, claiming priority based on Japanese Patent Application No. 2017-023081 filed Feb. 10, 2017.

TECHNICAL FIELD

The present invention relates to an emergency detachment mechanism for a fluid handling device suitable for handling liquid hydrogen or another cryogenic fluid.

BACKGROUND ART

Recently, with the escalating problem of global warming, there has been greater use of solar power, wind power, hydropower, geothermal power, and other types of natural energy (reusable energy) as alternatives to petroleum, natural gas, and other fossil fuels. These types of natural energy are currently converted mostly to energy in the form of electricity, but electricity is not suitable for large-volume storage and suffers great transport loss. Therefore, consideration is recently being given to efforts to produce hydrogen, which can be stored in large volumes and transported over long distances, using natural energy and proactively utilize hydrogen as hydrogen energy.

Not only is hydrogen advantageous in being readily stored and transported, but hydrogen is advantageous in various other ways, such as in being an inexhaustible above-ground substance as water and chemical compounds, in having great power as energy utilized as rocket fuel, etc., and in being clean energy that, even when burned, does not emit carbon dioxide or atmosphere-polluting substances due to reacting with oxygen in the air to produce water.

Natural energy in Japan is quantitatively limited, and consideration is therefore also given to solving the Japanese energy problem in the future by producing large volumes of hydrogen utilizing foreign sources of natural energy, and storing and transporting this hydrogen.

On the basis of such a background, it is becoming urgent to establish technology for storing and transporting hydrogen along with the increase in hydrogen use; one example of this is the development of fluid handling devices (loading arms) for handling liquid hydrogen.

Hydrogen is a gas at room temperature, and in a gaseous state is large in volume and unsuitable for storage and transport; therefore, hydrogen is commonly stored and transported in a liquefied state.

Hydrogen has a boiling point of −253° C., and therefore must be brought to a temperature of −253° C. or less in order to liquefy. Additionally, liquefied hydrogen evaporates very readily, and it is therefore an essential requirement that an environment of −253° C. or less be maintained in the storage and transportation of liquid hydrogen.

However, a problem with prior-art emergency detachment devices (emergency detachment mechanisms) is that heat insulation performance is poor and heat entering from the exterior readily reaches the fluid; therefore, when the liquid hydrogen is circulated, heat from the outside air raises the temperature of the circulating liquid hydrogen, the liquid hydrogen evaporates into a gaseous state during circulation, and the hydrogen cannot be efficiently transported.

Due to very-low-temperature liquid hydrogen being circulated, the temperature of the surface of the device reaches the same temperature (−253° C.) as the liquid hydrogen, whereby oxygen (boiling point: −183° C.) near the surface of the device liquefies to become liquefied oxygen, and this liquefied oxygen accumulates in the periphery of the fluid handling device. Furthermore, when an emergency detachment operation is performed and couplers connecting marine pipes and land pipes are separated from each other, a valve body blocking the fluid comes to be exposed, the surface temperature of this exposed valve body reaches the same temperature (−253° C.) as the liquid hydrogen, and oxygen (boiling point: −183° C.) near the exposed valve body therefore becomes liquid oxygen and accumulates in the periphery. This liquid oxygen is flammable; therefore, in the event that fire should occur due to some kind of difficulties, it is extremely dangerous for this liquid oxygen, a flammable gas, to be in the periphery.

The inventors painstakingly researched such various problems presented during the handling of liquid hydrogen, and have applied for a patent (JP-A 2015-139092) for an emergency detachment device of a fluid handling device with which these problems are solved and liquid hydrogen can be handled safely and efficiently.

In this emergency detachment device of a fluid handling device (referred to below as the invention of the prior application), couplers are given a vacuum double-wall structure, and two emergency shutoff valves are aligned along a fluid circulation direction. During an emergency detachment, first, the two emergency shutoff valves are closed, fluid remaining in a section partitioned by the two emergency shutoff valves is then returned into a handling pipe by a remaining fluid transfer mechanism to leave a space in the section partitioned by the two emergency shutoff valves, the space partitioned by the two emergency shutoff valves acts as a heat-insulating part, the exiting and entering of heat between the insides and outsides of the couplers, whether connected or detached, is minimized as much as possible, the fluid in the couplers is prevented from evaporating, a cooling effect of the fluid on outer surfaces of the externally exposed couplers (outer-side emergency heat-insulating valves and outer wall parts) is reduced as much as possible, and the oxygen in the periphery is prevented from being liquefied by the extreme temperature decrease near the outer surfaces of the couplers.

DISCLOSURE OF THE INVENTION

Problems the Invention is Intended to Solve

The present invention relates to an improvement of the invention of the prior application, it being an object of the present invention to provide an innovative emergency detachment mechanism for a fluid handling device that, with an extremely simple configuration, exhibits exceptional heat insulation performance whether couplers are connected or separated, minimizes an evaporation effect caused by an increase in a temperature of a fluid circulating through the couplers to enable efficient fluid handling work, minimizes liquefication of oxygen in a periphery to minimize the production of liquefied oxygen, and makes it possible to improve safety in the periphery.

Means for Solving Problems

The main points of the present invention are described below with reference to the attached drawings.

The present invention relates to an emergency detachment mechanism for a fluid handling device, which is suitable for application in a fluid handling device that handles a very-low-temperature fluid and that is configured such that: a pair of couplers 1, each provided with a valve body 7 for blocking circulation of a fluid during an emergency, are separably connected in a state of abutment by a connecting mechanism 10; during an emergency detachment, the connecting mechanism 10 performs a disconnecting operation to disconnect the couplers 1 from each other, the valve bodies 7 provided to the couplers 1 close and opening parts of the couplers 1 close due to the couplers 1 being disconnected, and the couplers are emergency-detached in a state in which fluid circulation is blocked and the fluid is prevented from flowing out to the exterior; the emergency detachment mechanism characterized in that: each of the pair of couplers 1 is composed of a coupler body part 5 formed into a tubular shape through which a fluid circulates, the valve body 7 that closes off the opening part of the coupler body part 5 during emergency detachment, and a valve body drive mechanism for actuating the valve body 7; all constituent members of the valve body drive mechanism are provided inside the coupler body part 5 and the valve body drive mechanism has an urging body 11 that urges the valve body 7 toward the opening part of the coupler body part 5; the valve body 7 is urged toward the opening part of the coupler body part 5 by urging force of the urging body 11 of the valve body drive mechanism provided inside the coupler body part 5; when the couplers 1 are connected to each other, the opposing valve bodies 7 are pushed against each other to retract against the urging force of the urging bodies 11, opening up the opening parts of the coupler body parts 5, and when the couplers 1 are disconnected and separated from each other, the valve bodies 7 are caused to protrude by the urging force of the urging bodies 11 to engage by pressure contact with the opening parts of the coupler body parts 5 and close off the opening parts of the coupler body parts 5; the coupler body parts 5 are each formed from an internal tube part 2 in which a fluid passes through an interior, an external tube part 3 which is more enlarged in diameter at a distal end side than the internal tube part 2, and a connecting flange part 4 that closes off a space between the internal tube part 2 and the external tube part 3, a vacuum layer 9 being formed between the internal tube part 2 and the external tube part 3; the connecting flange part 4 has a wall thickness less than a wall thickness of the external tube part 3, and is provided between distal ends of the internal tube part and the external tube part 3 where a clearance between the internal tube part 2 and the external tube part 3 is greatest; and when the couplers 1 are connected to each other, a heat-conducting part between the internal tube part 2 and the external tube part 3 is only the connecting flange part 4.

The invention also relates to an emergency detachment mechanism for a fluid handling device according to the first aspect, characterized in that the valve bodies 7 are each composed of a valve body base part 7A and a valve body distal end part 7B that covers a distal end side of the valve body base part 7A and that is exposed to the atmosphere when the couplers 1 are separated from each other, and the valve body distal end parts 7B are made of a resin.

The invention also relates to an emergency detachment mechanism for a fluid handling device according to a third aspect, characterized in that a peripheral edge of the opening part of each of the coupler body parts 5 is provided with a valve seat 6 that sections off the opening part, and the valve seat 6 and the valve body base part 7A that engages by pressure contact with the valve seat 6 are both made of a metal.

The invention also relates to an emergency detachment mechanism for a fluid handling device according to a fourth aspect, characterized in that engaging surfaces where each of the valve seats 6 and valve body base parts 7A engage with each other are formed into level differences, seals 8 are provided to the level-difference parts of the valve seats 6 or the valve body base parts 7A, and the valve seats 6 and the valve body base parts 7A are firmly engaged by the plurality of seals 8 provided in multiple rows to the engaging surfaces.

Effect of the Invention

Due to being configured as described above, the present invention results in an innovative emergency detachment mechanism for a fluid handling device having an extremely simple configuration, in which heat conduction between an internal tube part and an external tube part is minimized as much as possible and exceptional heat insulation performance is exhibited whether couplers are connected or separated, whereby an evaporation effect caused by an increase in a temperature of a fluid circulating through the internal tube part is minimized to enable efficient fluid handling work, liquefication of oxygen in a periphery is minimized, the production of liquefied oxygen is minimized, and safety in the periphery is improved.

BEST MODE FOR CARRYING OUT THE INVENTION

Figure 1:
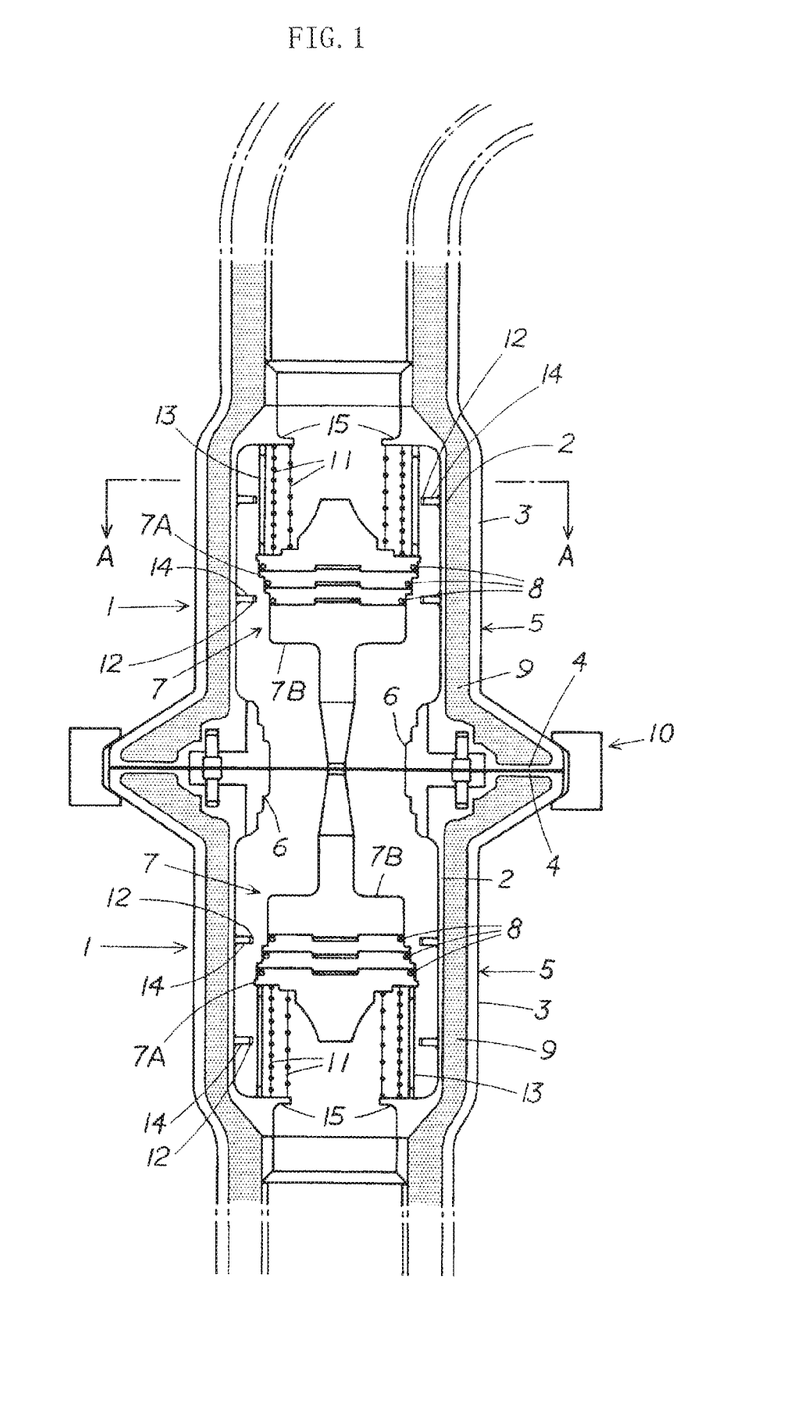
FIG. 1 is an explanatory front cross-sectional view showing a present embodiment (connected state)
Figure 2:
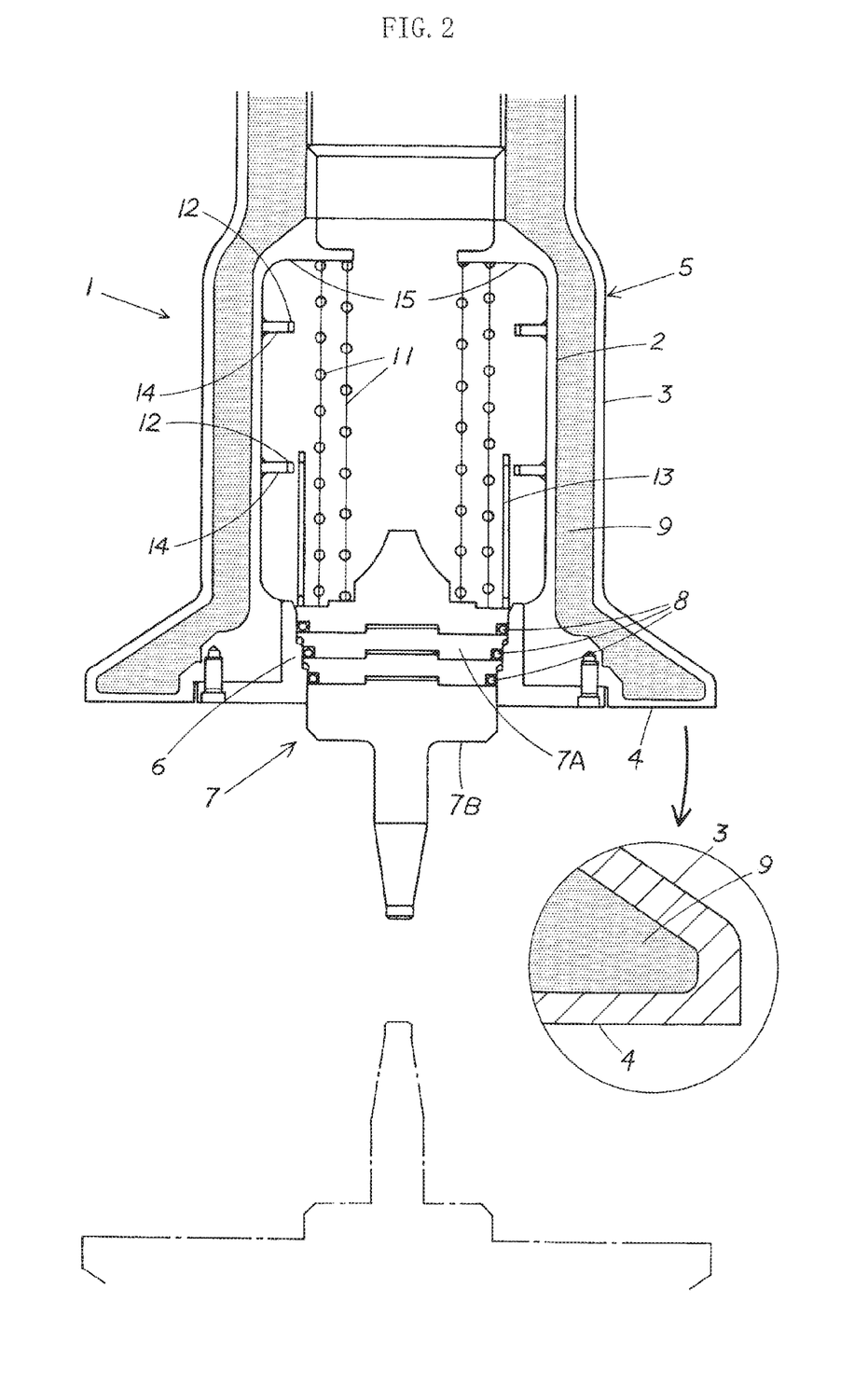
FIG. 2 is an explanatory front cross-sectional view showing the present embodiment (detached state)
Figure 3:
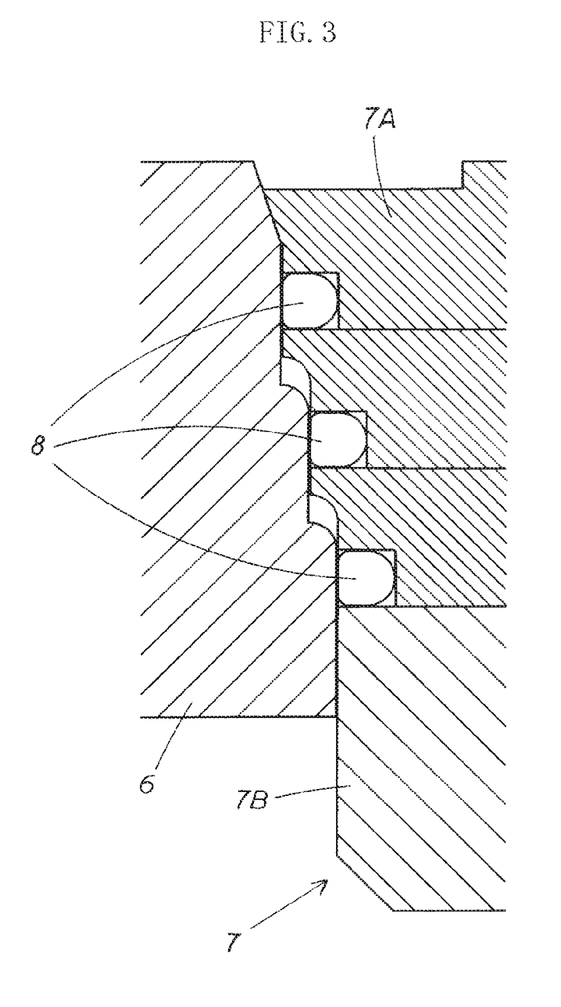
FIG. 3 is an enlarged cross-sectional view of a main part of an emergency shutoff valve of the present embodiment.
Figure 4:
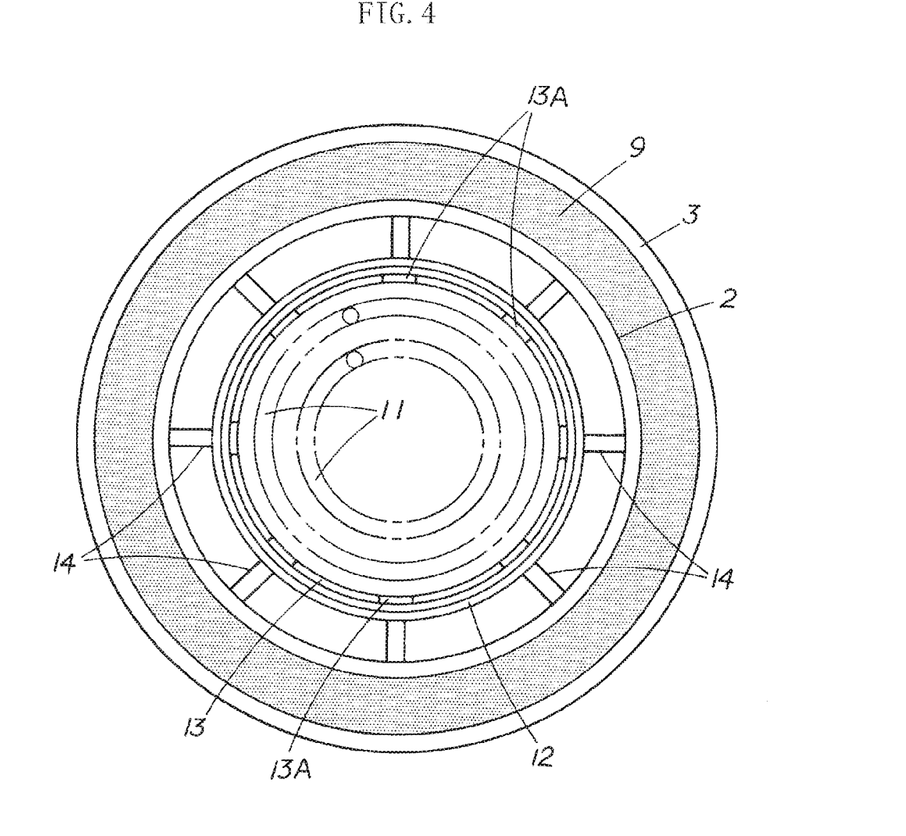
FIG. 4 is a cross-sectional view along line A-A in FIG. 1.

A preferred embodiment of the present invention is briefly described below with reference to the diagrams, with the actions of the present invention presented as well.

In the present invention, a vacuum layer is formed between an internal tube part 2 and an external tube part 3, and heat is therefore conducted between the internal tube part 2 and the external tube part 3 via a connecting flange part 4.

That is, heat from the exterior is conducted from the external tube part 3, which is exposed to the exterior (the atmosphere), to the internal tube part 2 through the connecting flange part 4, and heat of a fluid (cooling action) is conducted from the internal tube part 2, with which the fluid is in contact, to the external tube part 3 through the connecting flange part 4.

The present invention is configured such that a wall thickness of the connecting flange part 4, which is a heat-conducting part between the internal tube part 2 and the external tube part 3, is set to be less than a wall thickness of the external tube part 3, and heat conductivity in the connecting flange part 4 is less than heat conductivity of the external tube part 3 (heat is transferred less readily); therefore, heat conduction from the external tube part 3 to the internal tube part 2 and also from the internal tube part 2 to the external tube part 3 does not occur readily. Consequently, heat entering due to the outside air temperature is minimally conducted to a fluid circulating within the internal tube part 2, any increase in fluid temperature is minimized, and any extreme temperature decrease in the external tube part 3 (a surface of the external tube part 3), caused by a cooling effect of a very-low-temperature fluid (liquid hydrogen) circulating within the internal tube part 2, is minimized.

Due to these characteristics, evaporation of the fluid circulating within the internal tube part 2 is minimized as much as possible, fluid handling work can be performed efficiently, liquification of oxygen in the periphery is minimized, production of flammable liquefied oxygen is minimized, and safety of the device periphery can be ensured.

Thus, the present invention is an exceptionally practical and safe breakthrough emergency detachment mechanism for a fluid handling device, in which the configuration is extremely simple, heat conduction between the internal tube part 2 and the external tube part 3 constituting a coupler 1 is minimized as much as possible, and exceptional heat insulation performance is exhibited whether two couplers 1 are connected or separated.

Embodiments

A specific embodiment of the present invention is described below with reference to the drawings.

The present embodiment is an emergency detachment mechanism for a fluid handling device suitable for handling liquid hydrogen or another very-low-temperature fluid.

Specifically, the emergency detachment mechanism of the present embodiment is configured so that a pair of couplers 1, each provided with an emergency shutoff valve (a valve seat 6 and a valve body 7) for shutting off the circulation of fluid during an emergency, are separably connected in a state of abutment by a connecting mechanism 10. During an emergency detachment, the connecting mechanism 10 performs a disconnecting operation to disconnect the couplers 1, the disconnecting of the couplers 1 causes the valve bodies 7 provided to the couplers 1 to close and opening parts of the couplers 1 to be closed off, fluid circulation in a fluid handling pipe and the emergency detachment mechanism is shut off, and an emergency detachment is performed in a state of preventing the fluid from flowing out to the exterior.

More specifically, the coupler 1 of the present embodiment is configured from a coupler body part 5 formed into a tubular shape through which the fluid can circulate, an emergency shutoff valve that closes off an opening part of the coupler body part 5 to shut off fluid circulation and prevent the fluid from flowing out to the exterior during an emergency, and a valve drive mechanism for actuating the emergency shutoff valve.

The parts of the configuration according to the present embodiment are described in detail below. A description of the connecting mechanism 10 of the present embodiment is omitted because the same configuration as those of publicly known prior-art structures is applied, and the coupler 1 is described in detail in the present embodiment.

The coupler body part 5 of the present embodiment is configured from the internal tube part 2 which is open at a distal-end side and through the interior of which the fluid passes, the external tube part 3 which is open at a distal-end side and which forms a vacuum layer 9 with the internal tube part 2, and the connecting flange part 4 which closes off a space between the internal tube part 2 and the external tube part 3.

That is, the coupler body part 5 of the present embodiment has a vacuum heat-insulating double-wall structure in which the vacuum layer 9 is formed in a space formed between the internal tube part 2 through which the fluid circulates and the external tube part 3 enclosing the internal tube part 2, the internal tube part 2 and the external tube part 3 being connected via the connecting flange part 4. In other words, the coupler body part of the present embodiment is configured such that the connecting flange part 4 is a heat-conducting part via which heat can move back and forth between the internal tube part 2 and the external tube part 3.

The wall thickness of this connecting flange part 4, which is a heat-conducting part, is set to be less than the wall thickness of the external tube part 3. Due to the wall thickness of the connecting flange part 4 being less than that of the external tube part 3 and heat conductivity being reduced in the connecting flange part 4 serving as a heat-conducting part (due to a structure in which heat is not transferred readily), heat conduction between the internal tube part 2 and the external tube part 3 is minimized as much as possible.

Specifically, in the present embodiment, the wall thickness of the external tube part 3 is 8 mm, while the wall thickness of the connecting flange part 4 is 6 mm. The wall thickness of the connecting flange part 4 is preferably set less than the external tube part 3, but is not limited to the dimension given and can be changed as appropriate within a range at which the strength of the connecting flange part 4 is not compromised.

The coupler body part 5 of the present embodiment is configured so that a portion of a prescribed length from the distal-end side of the external tube part 3 increases in diameter, and a inner-to-outer wall distance between the internal tube part 2 and the external tube part 3 in this increasing-diameter portion is greater than in the rest of the coupler body part 5.

Specifically, the coupler body part 5 of the present embodiment is configured such that the external tube part 3 is formed into a trumpet shape in which the distal end part in the increasing-diameter portion has the greatest inner-to-outer wall distance, the connecting flange part 4 is provided in a straddling state to this distal end part where the inner-to-outer wall distance is greatest, i.e., between the distal end parts of the internal tube part 2 and the external tube part 3, and the connecting flange part 4 is provided so as to close off a distal-end-side opening part of the space serving as the vacuum layer 9 formed between the internal tube part 2 and the external tube part 3.

That is, the present embodiment is configured such that the connecting flange part 4 is provided to a region where the inner-to-outer wall distance between the internal tube part 2 and the external tube part 3 is greatest, a width dimension of the connecting flange part 4 is increased, and the heat conductivity of the connecting flange part 4 serving as a heat-conducting part is reduced (a structure in which heat is not transferred readily), whereby heat conduction between the internal tube part 2 and the external tube part 3 is minimized as much as possible.

That is, the coupler body part 5 of the present embodiment is configured such that the connecting flange part 4, which is provided straddling between the internal tube part 2 and the external tube part 3 and is a heat-conducting part between the internal tube part 2 and the external tube part 3, is made thinner, enlarged in diameter, and configured as a low-heat-conducting part through which there is little heat conduction, and heat conduction between the internal tube part 2 and the external tube part 3 is minimized as much as possible by this connecting flange part 4 configured so as to be a low-heat-conducting part, whereby minimal heat from the outside air reaches the fluid inside the internal tube part 2, any increase in the temperature of the fluid circulating in the internal tube part 2 is minimized, and any extreme temperature decrease in the surface of the external tube part 3 caused by the cooling effect of the fluid in the internal tube part 2 is minimized.

The emergency shutoff valve of the present embodiment is configured from a valve seat 6 that is provided to the peripheral edge of the opening part of the coupler body part 5 and that sections off the opening part, and a valve body 7 that engages by pressure contact with the valve seat 6 and opens and closes the opening part of the coupler body part 5.

Specifically, the valve body 7 of the present embodiment is configured from a valve body base part 7A accommodated in the coupler body part 5 and a valve body distal end part 7B covering a distal-end side of the valve body base part 7A, is urged toward the opening part (toward the distal end) of the coupler body part 5 by a valve body drive mechanism (described hereinafter), and is configured so that the valve body base part 7A engages by pressure contact with the valve seat 6 and closes off the opening part of the coupler body part 5 during a detached state in which the couplers 1 are separated from each other.

More specifically, the valve body 7 of the present embodiment is configured such that in a state of being engaged by pressure contact with the valve seat 6, i.e., closing off the opening part of the coupler body part 5, when the valve body base part 7A has been accommodated in the coupler body part 5, the valve body distal end part 7B protrudes outward from the opening part of the coupler body part 5 to be exposed outside of the coupler body part 5 (to the atmosphere).

That is, the present embodiment is configured such that the valve body distal end part 7B protrudes from the coupler body part 5 toward the distal end when two couplers 1 have been detached from each other, and when two couplers 1 are connected to each other, the valve bodies 7 (the valve body distal end parts 7B) of the couplers 1 are pushed against each other to mesh together, whereby the valve bodies 7 are pushed back to the proximal ends of the coupler body parts 5 and the opening parts of the coupler body parts 5 are opened.

More specifically, in the present embodiment, the valve seat 6 and the valve body base part 7A are configured from metal members, and the valve body distal end part 7B is configured from a low-heat-conductive member, specifically a synthetic resin having low heat conductivity, and more specifically a fiber-reinforced plastic (FRP resin) having low heat conductivity and exceptional durability.

That is, the present embodiment is configured such that the valve body distal end part 7B of the valve body 7, which is exposed into the atmosphere when couplers are separated from each other, is configured from a low-heat-conductive member, whereby heat conduction through the valve body distal end part 7B is minimized.

That is, the present embodiment is configured such that the cooling effect of the fluid in the coupler body part 5 is not received readily due to the valve body distal end part 7B being configured from a low-heat-conductive member, whereby any extreme temperature decrease in the valve body distal end part 7B exposed to the atmosphere is minimized, and liquefication of oxygen in the periphery of the valve body distal end part 7B is minimized as much as possible.

The emergency shutoff valve of the present embodiment is also configured such that the valve seat 6 and the valve body base part 7A are tightly engaged by a plurality of seals 8 disposed in multiple rows, closing off the opening part of the coupler body part 5.

Specifically, engaging surfaces of the valve seat 6 and the valve body base part 7A are formed to have level differences, the seals 8 are disposed in the level-difference parts of the valve body base part 7A, and the valve seat 6 and the valve body (valve body base part 7A) are sealed in a multi-row scheme by the plurality of seals 8 provided to the valve body base part 7A.

That is, the emergency shutoff valve of the present embodiment is configured such that seals are created in a plurality of locations against the readily leaking liquid hydrogen, liquid-tightness is maintained, and leak resistance is improved. The present embodiment involves a triple seal structure in which the engaging surfaces have three level differences and the seals 8 are disposed in the step parts as illustrated, but design changes can be made as appropriate to the number of level differences in the engaging surfaces, i.e., to the number of seals 8 and to the seal positions.

The valve body drive mechanism of the present embodiment is configured from: an urging body 11 for urging the valve body 7 toward the distal end of the coupler body part 5; i.e., for causing the valve body 7 to engage by pressure contact with the valve seat 6; valve body guide parts 12 that guides movement of the valve body 7; and a slide part 13 movably guided by the valve body guide parts 12.

Specifically, the valve body guide parts 12 are imparted with an annular form, and are provided to an inner surface of the internal tube part 2 of the coupler body part 5 with a valve body guide support part 14 interposed therebetween.

More specifically, a plurality (two in the present embodiment) of the valve body guide parts 12 of the present embodiment are provided inside the coupler body part 5, along the flow direction of fluid circulating within the coupler body part 5 (within the internal tube part 2).

The urging body 11 and the slide part 13 are provided to the valve body 7 (the valve body base part 7A).

Specifically, the urging body 11 is composed of a spring body 11 (a coil-form spring), provided along the fluid circulation direction, and configured such that one longitudinal-direction-end part is interlocked with the valve body base part 7A, and an other end part is interlocked with the coupler body part 5, or specifically with a valve-body-receiving part 15 provided to the internal tube part 2 of the coupler body part 5.

The slide part 13 has numerous through-holes 13A through which the fluid can circulate, and is composed of a porous cylindrical plate capable of accommodating (enclosing) the spring body 11, provided to a bottom part of the valve body base part 7A, placed on inner sides of the above-described valve body guide parts 12, and free to slide relative to the valve body guide parts 12.

That is, the valve body drive mechanism of the present embodiment is configured so as to cause the valve body 7 to protrude and withdraw (reciprocate) in the flow direction of the fluid, and is specifically configured such that the valve body 7 is moved to protrude (moved forward) at the opening-part side of the coupler body part 5 (at the valve seat 6 side) by the stretching of the spring body 11 and moved to withdraw (retract) by the contraction of the spring body 11.

The valve drive mechanism of the present embodiment is also configured such that all constituent members are provided inside the coupler body part 5 (inside the internal tube part 2) and exposed at the outer side of the coupler body part 5 as described above. As a consequence, the valve drive mechanism is not a heat-conducting part between the inside and outside of the coupler body part 5, and heat conduction does not take place through the valve drive mechanism.

That is, the invention of the prior application is configured such that part of the valve drive mechanism that opens and closes the emergency shutoff valve (valve body) is exposed at the outer side of the coupler and heat conduction takes place between the inside and outside of the coupler through the valve drive mechanism of which part is exposed to the exterior, but the emergency detachment mechanism of the present embodiment is configured such that the constituent members are all provided inside the coupler body part 5 (inside the internal tube part 2) and exposed at the outer side of the coupler body part 5; therefore, the valve drive mechanism is not a heat-conducting part between the inside and outside of the coupler body part 5 and heat conduction does not take place between the inside and outside of the coupler 1 through the valve drive mechanism.

In the present embodiment configured as described above, in a normal state, i.e., in a connected state in which couplers 1 are connected to each other, the exiting and entering of heat is blocked by the vacuum layer 9 in parts of the couplers 1 (the coupler body parts 5) other than the connecting flange parts 4, and the connecting flange parts 4, which are the sole heat-conducting parts, reduce heat conductivity as much as possible. Therefore, the occurrence of heat entering the external tube part 3 and being transferred to the fluid circulating in the internal tube part 2 to raise the temperature of the fluid is minimized as much as possible, as is the occurrence of the external tube part 3 being greatly reduced in temperature by the cooling effect of the very-low-temperature fluid circulating in the internal tube part 2.

In an emergency detachment state, i.e., a detached state in which the couplers 1 are separated from each other, the valve body distal end parts 7B of the valve bodies 7, the connecting flange parts 4, and the valve seats 6 provided to the opening parts of the coupler body parts 5 are exposed to the atmosphere, but because the valve body distal end parts 7B are configured from low-heat-conductive members and for the most part do not function as heat-conducting parts, the connecting flange parts 4 and the valve seats 6 outside of the valve body distal end parts 7B are heat-conducting parts and the area of external exposure of these components is extremely small; therefore, in this detached state, as with the previously described connected state, heat conduction is minimized as much as possible, the occurrence of heat entering from the exterior and being transferred to the fluid circulating in the internal tube part 2 to raise the temperature of the fluid is minimized as much as possible, as is the occurrence of the external tube part 3 being greatly reduced in temperature by the cooling effect of the very-low-temperature fluid circulating in the internal tube part 2.

Thus, the present embodiment is an emergency detachment mechanism for an exceptionally safe fluid handling device which, whether couplers are connected or detached, exhibits exceptional heat insulation performance due to having fewer heat-conducting parts through which heat exits and enters the internal tube part 2 and the external tube part 3 of the coupler 1, and reducing the heat conductivity of the formed heat-conducting parts, and which in comparison with the invention of the prior application, better prevents evaporation by temperature increase of the fluid circulating in the fluid handling device, makes it possible to improve the efficiency of the fluid handling work, more reliably prevents liquefication of oxygen in the periphery, and more reliably prevents the production of flammable liquid oxygen.

The present embodiment is also an exceptionally practical emergency detachment mechanism for a fluid handling device in which the opening part of the coupler body part 5 is sealed in multiple rows in the emergency detachment state; therefore, leak resistance is improved, any leakage of readily leaking liquid oxygen is suppressed as much as possible, and safety is further improved.

The present embodiment is not provided by way of limitation on the present invention; the specific configurations of the constituent elements can be designed as appropriate.

The invention claimed is:

1. An emergency detachment mechanism for a fluid handling device which is suitable for application in a fluid handling device that handles a very-low-temperature fluid, comprising:

a pair of couplers, each provided with a valve body for blocking circulation of a fluid during an emergency, are separably connected in a state of abutment by a connecting mechanism; during an emergency detachment, the connecting mechanism performs a disconnecting operation to disconnect the couplers from each other, the valve bodies provided to the couplers close due to the couplers being disconnected, and opening parts of the couplers close due to the couplers being disconnected, and the couplers are emergency-detached in a state in which fluid circulation is blocked and the fluid is prevented from flowing out to the exterior; the emergency detachment mechanism for a fluid handling device;

wherein each of the pair of couplers is composed of a coupler body part formed into a tubular shape through which a fluid circulates, the valve body that closes off the opening part of the coupler body part during emergency detachment, and a valve body drive mechanism for actuating the valve body; all constituent members of the valve body drive mechanism are provided inside the coupler body part and the valve body drive mechanism has an urging body that urges the valve body toward the opening part of the coupler body part; the valve body is urged toward the opening part of the coupler body part by urging force of the urging body of the valve body drive mechanism provided inside the coupler body part; when the couplers are connected to each other, the valve bodies are pushed against each other to retract against the urging force of the urging bodies, opening up the opening parts of the coupler body parts, and when the couplers are disconnected and separated from each other, the valve bodies are caused to protrude by the urging force of the urging bodies to engage by pressure contact with the opening parts of the coupler body parts and close off the opening parts of the coupler body parts; the coupler body parts are each formed from an internal tube part in which a fluid passes through an interior, an external tube part which is more enlarged in diameter at a distal end side than the internal tube part, and a connecting flange part that closes off a space between the internal tube part and the external tube part, a vacuum layer being formed between the internal tube part and the external tube part; the connecting flange part has a wall thickness less than a wall thickness of the external tube part, and is provided between distal ends of the internal tube part and the external tube part where a clearance between the internal tube part and the external tube part is greatest; and when the couplers are connected to each other, a heat-conducting part between the internal tube part and the external tube part is only the connecting flange part.

2. The emergency detachment mechanism for a fluid handling device according to claim 1, wherein the valve bodies are each composed of a valve body base part and a valve body distal end part that covers a distal end side of the valve body base part and that is exposed to the atmosphere when the couplers are separated from each other, and the valve body distal end parts are made of a resin.

3. The emergency detachment mechanism for a fluid handling device according to claim 2, wherein a peripheral edge of the opening part of each of the coupler body parts is provided with a valve seat that sections off the opening part, and the valve seat and the valve body base part that engages by pressure contact with the valve seat are both made of a metal.

4. The emergency detachment mechanism for a fluid handling device according to claim 3, wherein engaging surfaces where each of the valve seats and valve body base parts engage with each other are formed into level differences, seals are provided to the level-difference parts of the valve seats or the valve body base parts, and the valve seats and the valve body base parts are engaged by the plurality of seals provided in multiple rows.

* * * * *